United States Patent [19]
Fleche et al.

[11] Patent Number: 5,360,473
[45] Date of Patent: Nov. 1, 1994

[54] THERMOFORMABLE COMPOUNDS, THEIR PROCESS OF PREPARATION AND THEIR USE IN ORDER TO OBTAIN THERMOFORMED ARTICLES

[75] Inventors: Guy Fleche, Hazebrouck; Serge Gosset, Lestrem; Morand Lambla, Hoenhein, all of France

[73] Assignee: Roquette Freres, Lestrem, France

[21] Appl. No.: 827,214

[22] Filed: Jan. 30, 1992

[30] Foreign Application Priority Data

Jan. 31, 1991 [FR] France .................. 91 01120

[51] Int. Cl.$^5$ .................. C09D 103/02; C09D 103/12
[52] U.S. Cl. .................. 106/210; 106/213
[58] Field of Search .................. 106/210, 213

[56] References Cited

U.S. PATENT DOCUMENTS 4,076,846  2/1978  Nakatsuka et al. .................. 426/248

FOREIGN PATENT DOCUMENTS 0118240  9/1984  European Pat. Off. .
0282451  9/1988  European Pat. Off. .
2292005  6/1976  France .

OTHER PUBLICATIONS

WPI, File Supplier, AN-76-12150X, Derwent Publications Ltd., London, GB. (Aug. 1975).

Primary Examiner—David Brunsman
Attorney, Agent, or Firm—Wegner, Cantor, Mueller & Player

[57] ABSTRACT

Thermoformable compound characterized by the fact that it contains at least one amylaceous component and at least one hydroxycarboxylic acid salt.

23 Claims, 12 Drawing Sheets

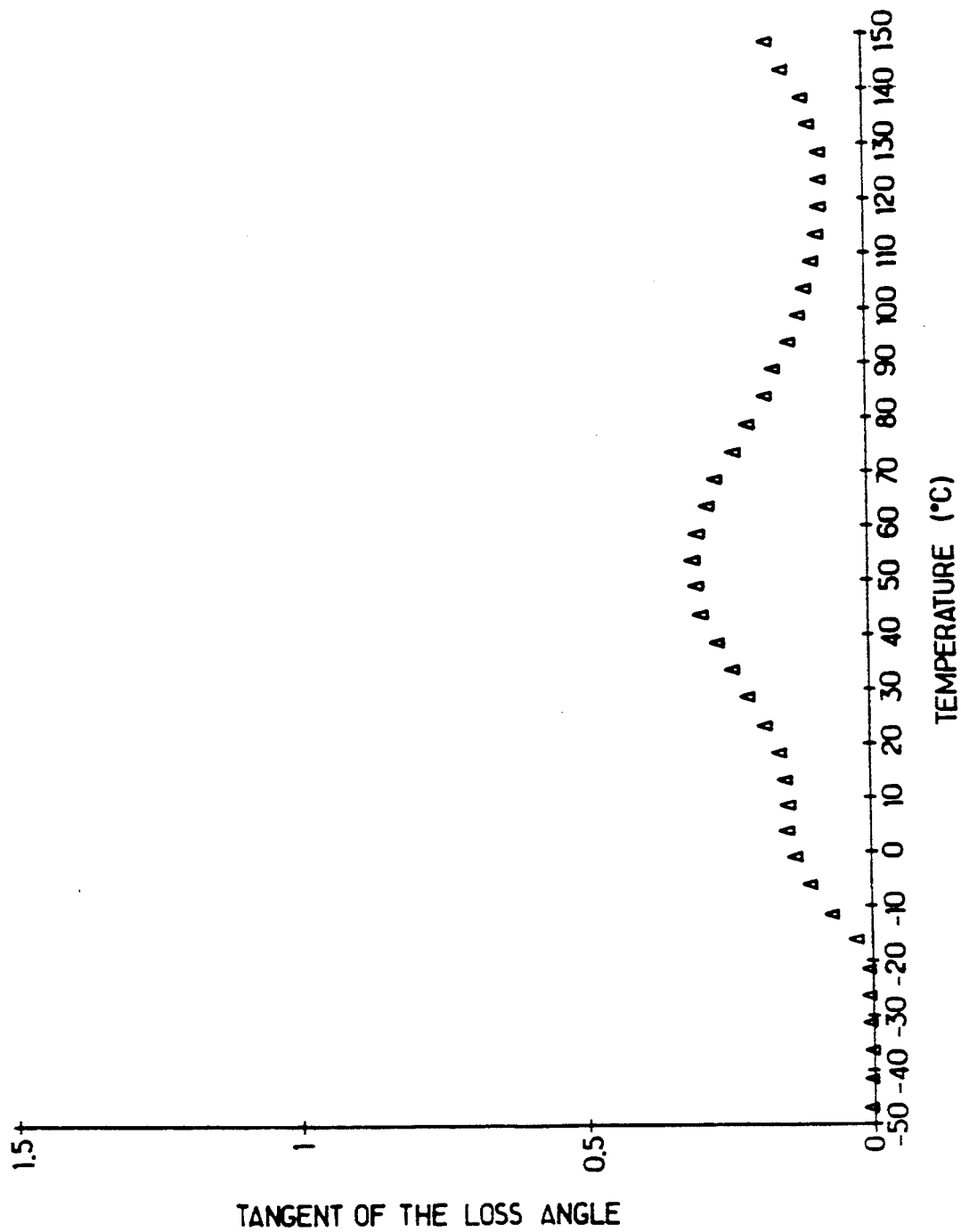

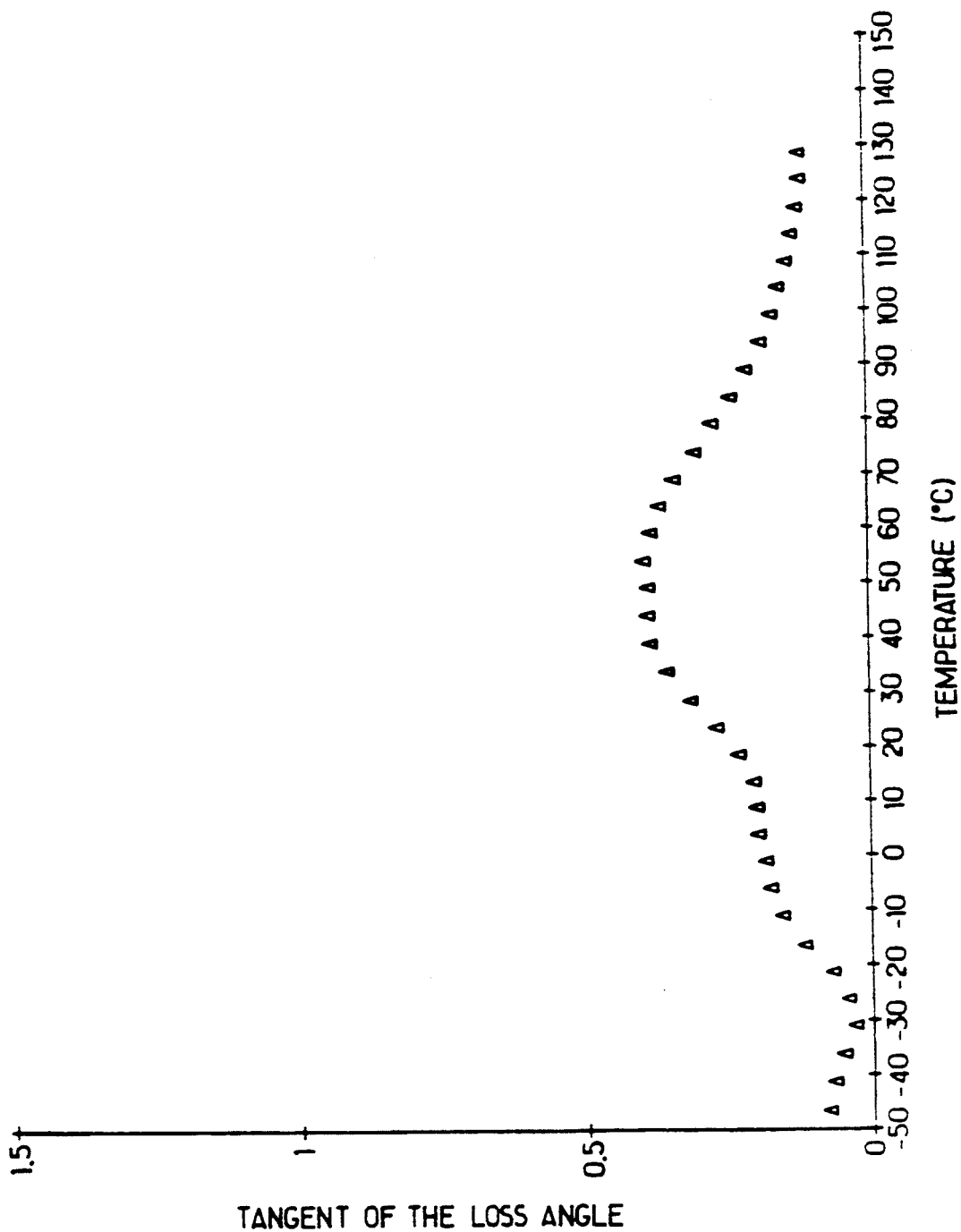

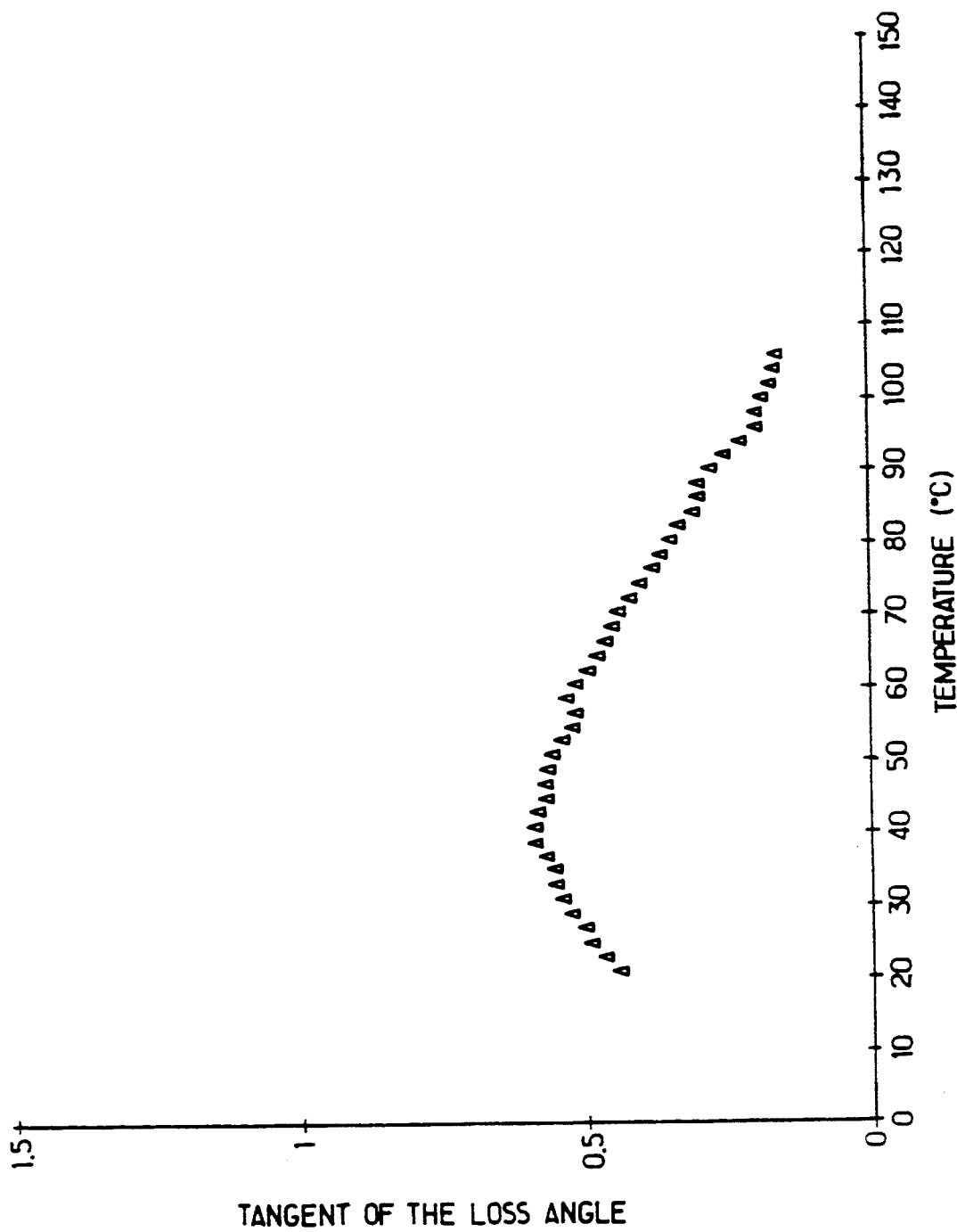

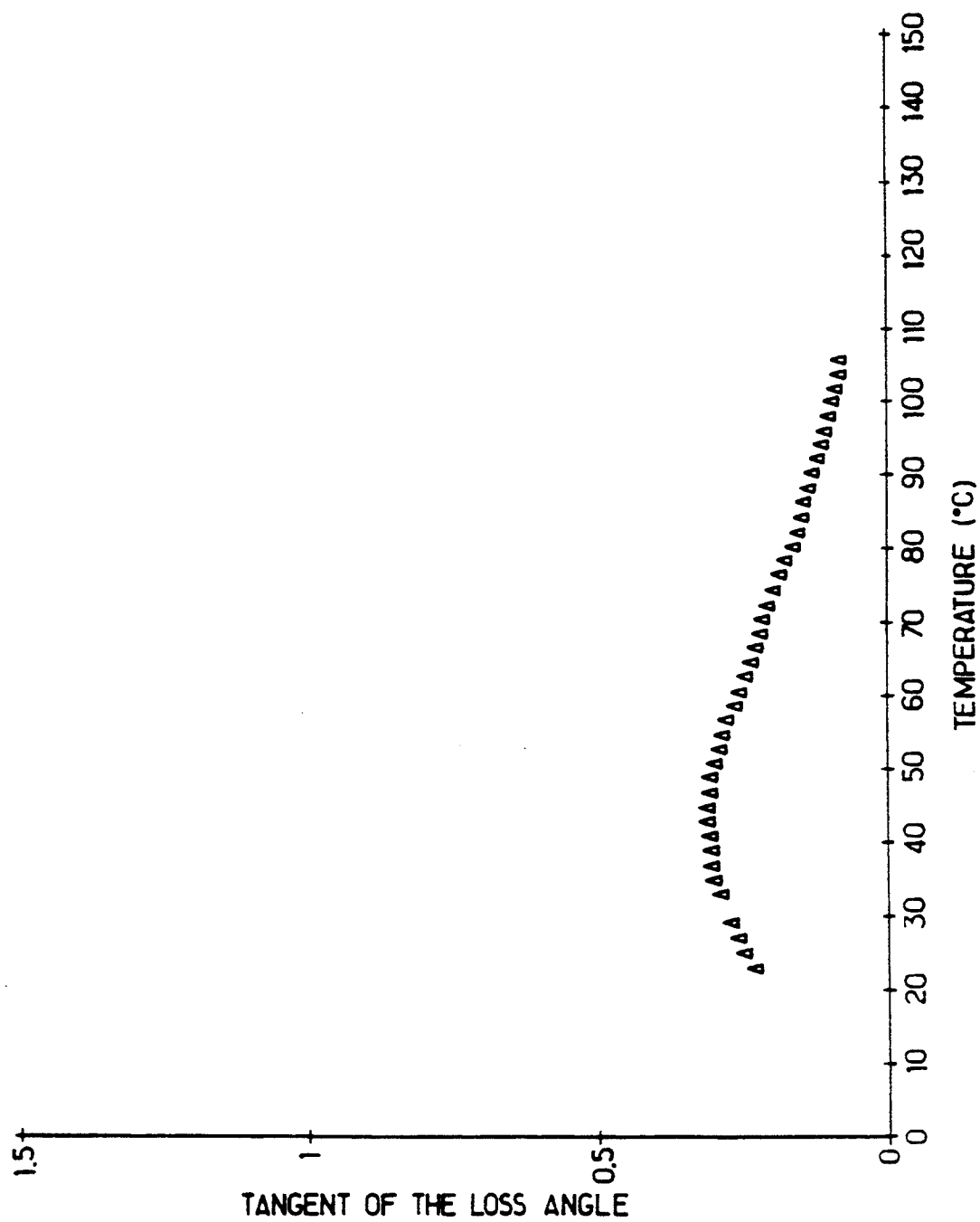

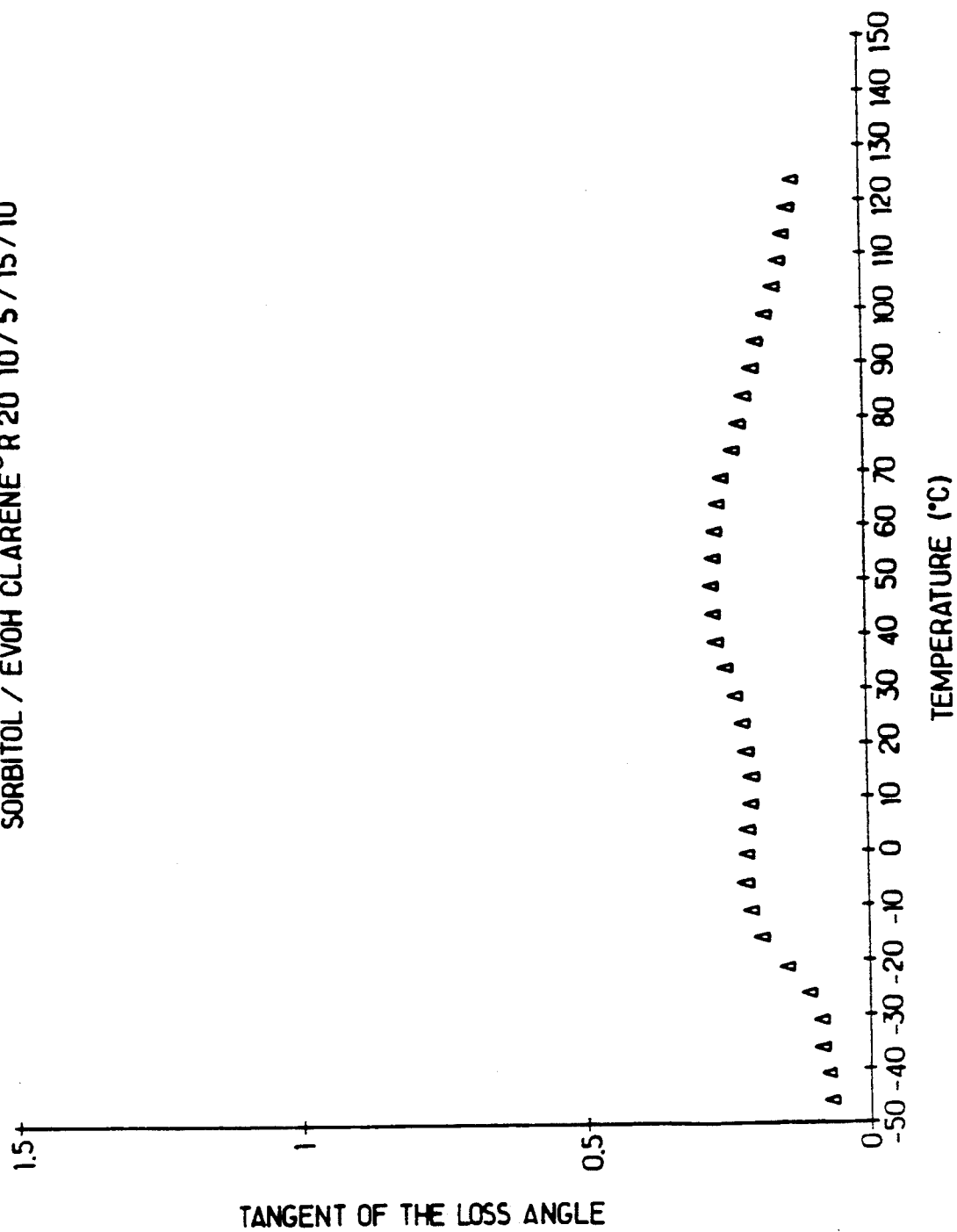

THERMOFORMABLE COMPOUNDS, THEIR PROCESS OF PREPARATION AND THEIR USE IN ORDER TO OBTAIN THERMOFORMED ARTICLES

The subject of the present invention is a novel thermoformable compound. This invention also concerns a new process for the preparation of a thermoformable compound as well as the use of said compound in view of obtaining thermoformed articles.

The preparation of articles of defined shape and in particular the techniques of thermoforming, that is to say the realization of shapes through the action of temperature, makes extensive use of synthetic materials such as polyethylene, polypropylene, polystyrene or polyvinylchloride. These synthetic materials are, for example, used for the preparation of articles of all shapes (sheets, tubes, rods or more elaborate shapes) and purposes, such as packings (trash bags or containers), culture mulch, bottles and certain consumer articles (glasses, lots, sheets), etc.

However, these synthetic materials are beginning to create serious environmental problems due to their slow disappearance in the various ecosystems where they are degraded only after several decades.

Today, operations based on recycling and incineration are already helping to limit the harmful effects of synthetic plastic waste. The development and optimization of these operations will lead to a notable reduction of pollution. Likewise, proposals have been made to accelerate the degradation of synthetic polymers by photooxidation. For example, unsaturated fatty acid based additives in combination with heavy metals, under the action of light, lead to the degradation of the synthetic macromolecule by a radical mechanism. The small chains obtained in this manner promote the dispersion of the material and its elimination in the natural surroundings. However, these photometabolites may themselves sometimes cause pollution problems.

Other solutions are based on the principle of the biodegradation of biodegradable elements introduced into a synthetic polymer so as to form what has been agreed to be called a degradable plastic. Several methods characterize this approach which, to a large extent, is based on the use of starch as the biodegradable element. This polymer has the advantage of being a source of annually renewable raw material which is biodegradable by enzymes secreted by microorganisms such as bacteria and moulds. Globally, these methods may be broken down into three groups according to the method by which the starch is used.

A first technology, described for example in patent FR 2252385, consists in the introduction into a polyolefinic material, constituted notably by polyethylene, of starch granules at a level generally in the range of 5 to 30%, more particularly on the order of 15%. The starch acts as a charge which is uniformly dispersed in the polyethylenic material. There is no interaction between the very hydrophilic starch and the very hydrophobic polymer. The starch is added either directly to the polyethylene, or more commonly by means of a master mixture which may contain up to 50% starch. The starch is generally dehydrated (water content less than 1%), and a variant embodiment of the process, described in patent GB 1487050, envisages the preliminary coating of the granule by hydrophobic sililated groups so as to enhance the starch-polyethylene comparability. In some cases, a photodegradation induction system is added to the starch, thereby allowing a combination of bio-and photo-degradations.

Starch contributes characteristic functional properties such as anti-blockage, better printability, antistatism ... in moulded articles or films, although with a reduction of mechanical properties in the case of films.

A second technology, described for example in patents EP 32802 and EP 132299, consists, in view of obtaining flexible films, in the introduction of a continuous phase of starch into a synthetic polymer so as to constitute a structure that may be described as a composite. The starch granule disintegrated by gelatinization or extrusion is, as described in patent EP 32802, dispersed in a synthetic polymer of hydrophilic nature such as the copolymer of ethylene acrylic acid (EAA), partially neutralized, possibly in the presence of a plasticizer such as glycerol or ethylene glycol. This technique allows the introduction of 50 to 60% starch. The synthetic starch-polymer composite thus obtained is presented as allowing the manufacture of extruded films with improved mechanical resistance and better biodegradability. In this system, the starch is gelatinized in the presence of water and the water content of the mixture must be lowered into the range of 2–10% before moulding or extrusion.

In light of the maximum quantities of water thus required, it is described as generally necessary to perform at least two passages of the compounds on the extruder, which renders this technology complex and costly in terms of energy, in addition to being apparently difficult to extrapolate to continuous production of articles containing high proportions of starch.

Furthermore, according to the indications of the aforementioned patent EP 32802, the presence of 30 to 40% starch by weight within the composite requires the utilization of polyethylene (10 to 40%) in order to strengthen the mechanical properties of the obtained films.

Both technologies described above generally make use of mixtures of starch and synthetic resins.

The third technology, described in particular in patents EP 118 240 and EP 326 517, is directed to obtaining a thermoformable material based essentially on starch. To achieve this goal, the starch must be in the form of granules destructurized by melting. It may then be used on standard equipment for the transformation of plastics. It is generally necessary to add a plasticizer to the starch during the course of this treatment. The finished products obtained, composed mainly of starch, are by their very nature biodegradable.

The manufacture of a thermoformable material with a high starch content such as described in patent EP 118 240 requires rather high temperature and pressure ranges (temperatures higher than 120° C. and pressures of several hundred bars) in order to satisfy the transformation conditions in an injection machine. However, the articles, in particular the capsules, obtained after moulding and cooling are rigid, very fragile and hygroscopic, and their mechanical properties vary according to their water content. In order to reduce this water sensitivity or to modify the final properties of the amylaceous material, it is moreover often recommended to combine it with one or several additives, particularly chosen from:

hydrophilic agents and for example, gelatin, proteins, water-soluble polysaccharides, mineral charge agents and for example, the oxides of magnesium, aluminum or titanium, plasticizers and for example polyethylene glycol.

The combination of destructurized starch with water-insoluble synthetic thermoplastic polymers has also been described, for example in patent EP 327 505.

In view of improving the conditions of implementation of the amylaceous material, it has been recommended, as described in patent EP 282 451, to destructurize the starch at an elevated temperature (preferably 160° to 185° C.) in the presence of a catalyst of starch depolymerization, said catalyst, for example hydrochloric acid, enabling the reduction of the mean molecular weight of the starch by a factor of 2 to 5,000.

To this date, as described above, the gist of these attempts bearing on the macromolecular exploitation of amylaceous materials in view of the preparation of a thermoformable material, has been directed to a combined action of temperature and pressure.

It should be noted that although the process described in the aforementioned patent EP 326 517 touches upon the possibility of destructurizing starch by extrusion at pressures that are relatively low (less than 50 bar) compared to those envisaged by the injection method, said process still requires the use of elevated temperatures, in the range of 130° to 190° C.

Now, over and above the energy costs associated with these operating conditions, the latter do not permit the preservation of the intrinsic properties of the starch such as, in particular, the mean molecular weight which may not be maintained in all cases.

Consequently there existed a need to find a means of obtaining a thermoformable material that is simple, not costly, especially in terms of energy, which does not create any real degradability problems and which is applicable to the manufacture of a large range of thermoformed articles.

And the merit of the Applicant Company is to have found, in the course of work carried out in collaboration with the E.A.H.P.: Ecole d'Applications des Haut Polymères of Strasbourg and in a surprising and unexpected manner, that such a means could consist in the combination, in the presence or not of third constituents, of at least one amylaceous component and at least one hydroxycarboxylic acid salt.

More precisely, the present invention concerns a thermoformable compound characterized in that it contains at least one amylaceous component and at least one hydroxycarboxylic acid salt.

A first particularly advantageous aspect of the invention lies in the fact that the amylaceous component contained within said thermoformable compound may be used in conditions of temperature and/or pressure which are significantly less severe than those generally required in industrial practice and therefore more favorable to the maintenance of its intrinsic properties.

Following from which, the amylaceous component contained within the thermoformable compound which is the subject of the invention may favorably exist in a state which may be described as "partially melted".

This partially melted state differs from the gelatinization of starch and from its total melting. The gelatinization of starch, which is obtained by the use of a high proportion of water, results in colloidal dispersions. In contrast, the total melting of starch is obtained mainly by thermal treatment and leads to the complete disappearance of the starch granules. The partially melted state corresponds to an intermediate state in which may be observed an at least partial destruction of the intermolecular hydrogen bonds with the establishment of new hydrogen bonds between the water and the hydroxy groups of the starch. In this intermediate state a certain proportion of starch granules generally persists.

A second particularly meritorious aspect of the invention lies in the very wide applicability of the thermoformable compounds according to the invention, which makes it possible to obtain, including for a given thermoforming device and for given operating conditions, formed articles possessing a very large range of mechanical properties, especially in terms of viscoelasticity.

The Applicant Company has furthermore found that an efficient and original means for estimating said mechanical properties could consist in the use of the so-called Dynamic Mechanical Analysis method, which will be described in the examples below.

It will suffice at this point in the description to emphasize that the method of Dynamic Mechanical Analysis makes it possible to determine the tangent of the loss angle tg$\delta$ of a given material in a range of temperatures and in particular to know the temperature at which said material, which is tested in the form of a specimen of given dimensions, shows a maximum tangent of the loss angle tg$\delta$. The temperature determined in this manner makes it possible to approach the vitreous transition temperature of said material.

And it is noteworthy to underline that the compounds according to the invention allow, as will be described in more detail in the examples shown hereafter, the obtaining of thermoformed articles with a maximum tangent of the loss angle tg$\delta$ located in a very wide range of temperatures, notably between 0° and 150° C., i.e. in the range encompassing the vitreous transition temperatures of the majority of traditional synthetic polymers.

Meritoriously, the thermoformable compound which is the subject of the invention, containing at least one amylaceous component and at least one hydroxycarboxylic acid salt, is moreover characterized by the fact that it is capable of providing a thermoformed article with a tangent of the loss angle tg$\delta$ whose maximum value is located at a temperature of at most 150° C., notably between approximately 0° and 130° C.

Within the context of the present invention, the term amylaceous component is meant to signify all types of starch, regardless of their origin, whether they be native or modified by the chemical and/or physical route. When a native starch is used for the constitution of the compounds according to the invention, this is chosen in particular from the group consisting of natural or hybrid native starches from corn, from corn with a high amylopectin content (waxy starch), from corn with a high amylose content, from wheat, rice, peas, potatoes, manioc, the cuts or fractions which may be made or obtained from them, and any mixtures of at least any two of the aforementioned products.

When a chemically modified starch is used for the constitution of the compounds according to the invention, this is chosen in particular from the group consisting of starches modified by at least one or another of the known techniques of etherification, esterification, cross-linking, oxidation, alkaline treatment, acid and/or enzymatic hydrolysis.

As an example, one may favorably make use of starches etherified by ionic and in particular cationic groups, or nonionic groups, the latter consisting notably of hydroxyalkylated starches such as hydroxypropylated or hydroxyethylated starches.

Likewise, for example, one will make advantageous use of native or modified starches with a high amylose content, especially such cationic starches.

Within the context of the invention, one may also use starches which have previously been physically modified, for example by microwave or ultrasound treatment, extrusion cooking, drum gelatinization or by compaction, said starches being favourably in a state of modification which does not exceed the partially melted state described above.

Moreover, chemically modified starches such as those described above may, simultaneously, prior to or subsequent to the process of chemical modification, have been subjected to such a physical modification treatment.

Within the scope of the present invention, the term "hydroxycarboxylic acid" designates any acid bearing at least one hydroxyl group and at least one carboxylic group.

This definition particularly applies to acids of the type:
 monohydroxy/monocarboxylic such as lactic, glycolic or hydroxybutyric acids,
 monohydroxy/polycarboxylic such as citric, isocitric, malic or tartronic acids,
 polyhydroxy/monocarboxylic such as gluconic, maltobionic, lactobionic, glucuronic, glyceric, ribonic, xylonic, galactonic or mevalonic acids,
 polyhydroxy/polycarboxylic such as tartric, mesoxalic or glucaric acids,
 any mixture of at least any two of said acids such as, for example, oxidized starch hydrolysates containing, among other things and in variable proportions, gluconic acid and maltobionic acid, and particularly oxidized glucose syrups (OGS).

The hydroxycarboxylic acid salt which is put to use in the compound which is the subject of the invention may in particular be chosen from the group consisting of the salts of monohydroxy/monocarboxylic acids and the salts of polyhydroxy/monocarboxylic acids, particularly the salts of lactic acid, gluconic acid, maltobionic acid, lactobionic acid or glyceric acid, as well as any mixtures of at least two of any such salts.

The salts used are preferably those which associate the hydroxycarboxylic acid with an alkali metal or an alkaline earth metal, in particular with a metal chosen from the group consisting of sodium, potassium, calcium and magnesium. In view of improving the ageing ability and/or water resistance of thermoformed articles obtained from compounds according to the invention, the former may notably comprise a potassium salt of an hydroxycarboxylic acid.

In an entirely favourable embodiment, the compound according to the invention contains as the hydroxycarboxylic acid salt at least one salt of lactic acid, in particular an alkali metal or alkaline earth metal salt of lactic acid and notably sodium lactate or potassium lactate.

It must be noted that the hydroxycarboxylic acid salt may, although this is not preferred, be generated in situ, that is to say by the placing in the presence of the compound according to the invention, a hydroxycarboxylic acid such as lactic acid and a suitable base (sodium hydroxide, potassium hydroxide, lime, amine), taking care to avoid, contrary to the teachings of the aforementioned patent EP 282 451, any acid catalysis capable of substantially depolymerizing the amylaceous component.

Preferably, the compound according to the invention presents a weight ratio between the amylaceous component(s) on the one hand and the hydroxycarboxylic acid salt(s) on the other hand in the range between approximately 99/1 and 25/75 and more preferably between 98/2 and 60/40, with the understanding that the weight of the hydroxycarboxylic salt or salts used is taken into account.

Other than the characteristic presence of at least one amylaceous component and at least one hydroxycarboxylic acid salt, notably a salt of lactic acid, the compound according to the invention may contain one or several additives of any nature and function (extension or charge agents, synthetic resins, plasticizers, lubricants, dyes or other), for example one or several of the additives described more particularly in terms of the aforementioned patent EP 118 240.

The compound according to the invention may particularly contain, and this list is not limiting:
 one or several additives chosen from the group consisting of urea and its derivatives, hydrogenated sugars such as sorbitol, mannitol, maltitol, lactitol and the products which may contain them such as hydrogenated starch hydrolysates, glycols, polyethylene and polypropylene glycols, glycerol and its derivatives, anionic surfactants as well as any mixtures of at least any two of the said additives.

In practice, the above additives may globally represent from approximately 0.5% by weight up to 30% by weight of the compound which is the subject of the invention, with the understanding that an additive such as urea will be preferentially employed at levels generally not exceeding approximately 10% by weight.
 one or several synthetic resins such as polyethylene, polypropylene, polyvinylchloride, the polyamides, the ethylene/acetate vinyl copolymers and their derivatives (EVA) and (EVOH), the ethylene/acid acrylic copolymers and their derivatives (EAA). These resins may be present in the compounds according to the invention at high levels which may reach approximately 70% by weight of the total compound. In such a case, the combination of the amylaceous component and the hydroxycarboxylic acid salt appears more like an additive of thermoplastic compounds.

However, when high biodegradability is sought for thermoformed articles of everyday use, said synthetic resins will be, in case of implementation, preferentially introduced at levels not exceeding approximately 20% by weight of the compound according to the invention, in particular between 0.5 and 10% by weight.
 one or several mineral charges such as the oxides of titanium, silica or aluminum, talc, calcium carbonate and their mixtures, and this generally at levels not exceeding approximately 20% by weight of the compound according to the invention, and particularly between 0.01 and 5% by weight.
 one or several water-repellant agents such as those which are organosilicate in nature and for example the alkali or alkaline earth metal siliconates, the silicone oils, the silicone resins and their mixtures.
 one or several coloring, fire-repellant, lubricating, antioxidant or fungicidal agents.

Within the scope of the invention, one may particularly employ, as described below in the examples, additives such as sorbitol, urea, glycerol, their derivatives or even any mixtures of these components.

The water content of the compound according to the invention is not a dominant parameter in view of its application to the provision of thermoformed articles. In particular, there is no need to adjust this water content, especially to the low levels as described in some of the previously mentioned publications of the prior art.

It will simply be ascertained that the water content of said compound is such that it may be suitably handled in terms of the subsequent transformation equipment.

In practice, this water content does not exceed 40% and in particular is situated between approximately 5 and 30%.

Following from which, there is henceforth available a novel process for the preparation of a thermoformable compound characterized by the fact that an amylaceous component, in the presence or not of an hydroxycarboxylic acid salt and/or one or several additives of any nature, is subjected to a treatment capable of putting it into a partially melted state and that, possibly, the partially melted amylaceous component thus obtained is placed in the presence of at least one hydroxycarboxylic acid salt and/or one or several additives of any nature. The treatment to which the amylaceous component is subjected may be carried out on all types of standard devices, in particular those classically used for the application, to all types of products, of microwaves or ultrasound and/or used for the continuous or discontinuous transformation of plastic materials and elastomers, and particularly devices such as single-screw or double-screw extruders, mixers or injection moulding machines.

As an example, one may cite devices with a modular construction such as the MDK/E46 or MDK/E70 comixers marketed by the BUSS Company.

Preferably, the treatment to which the amylaceous component is subjected is carried out in conditions such that said amylaceous component does not undergo substantial depolymerization.

According to the process of the invention, the treatment to which the amylaceous component is subjected may be, for example, either a thermal treatment, combining or not the action of ultrasound and/or pressure with that of temperature, in particular an extrusion cooking treatment or a drum gelatinization, or a microwave treatment.

Furthermore, and this is an especially advantageous aspect of the present invention, the thermoformable amylaceous compounds may henceforth be prepared in operating conditions, notably in terms of temperature and/or pressure, which are significantly less severe than those generally required in industrial practice and therefore more favorable to the maintenance of the intrinsic properties of the amylaceous components employed.

Preferably, the thermal treatment, in particular the extrusion cooking to which the amylaceous component is subjected, is carried out at a temperature that does not exceed approximately 130° C., and is situated in particular between approximately 50° and 120° C.

In practice, for example, the aforementioned BUSS comixers may be used to this end by applying:
  temperatures of between approximately 80° and approximately 120° C., and notably between 80° and 100° C.,
  pressures lower than approximately 20 bar, in particular on the order of 2 to 5 bar.

According to a first variant embodiment of the process of preparation of the thermoformable compound according to the invention, the treatment to which the amylaceous component is subjected in view of putting it into a partially melted state is carried out in the absence of the hydroxycarboxylic acid salt, the partially melted amylaceous component obtained being subsequently placed in the presence, by any suitable means, of at least one hydroxycarboxylic acid salt, the latter being able, although this is not preferred, to be generated in situ within the resulting compound.

According to another variant embodiment of said process, the treatment to which the amylaceous component is subjected in view of putting it into a partially melted state is carried out in the presence of at least one hydroxycarboxylic acid salt, said salt also able to be generated in situ within the resulting compound.

It must be emphasized that within the scope of the process of preparation of the thermoformable compound according to the invention, the use of and the contact between the amylaceous component, the hydroxycarboxylic acid salt and possible additives may be carried out according to a multitude of variations, notably with respect to the form of introduction (liquid, viscous or solid form, introduction by close mixture or by spraying, etc.) and the time of introduction (right from the start or progressive introduction) of each of these constituents within the compound.

It must also be emphasized that within the scope of the process according to the invention, the contact between the amylaceous component and the hydroxycarboxylic acid salt may be carried out by simple mixing in conditions of temperature which may be described as low, namely not exceeding 50° C., including temperatures close to or lower than ambient temperatures (20°–30° C.).

This possibility may be envisaged, as an example, in the case where said mixture is subjected to a microwave treatment and/or in the case where the amylaceous component of said mixture has previously been treated by microwaves.

Although this is not particularly recommended within the scope of the present invention, it may also be envisaged that the amylaceous component contained in said mixture has previously been destructurized by a method such as described in the aforementioned patents EP 118 240, EP 282 451, EP 326 517 or EP 327 505.

Following from which the thermoformable amylaceous compounds according to the invention, which constitute novel industrial products, may be used for the preparation of articles of all forms (rods, tubes, sheets, films, granulates, capsules or more elaborate forms) and all purposes, and this by the use of any available thermoforming technique and in particular by extrusion, coextrusion, injection moulding, blow or calender moulding.

As already presented, the very wide applicability of said thermoformable compounds is evidenced by, among other things, the possibility of obtaining, including for a given thermoforming device and given operating parameters, formed articles with a very wide range of mechanical properties, especially in terms of viscoelasticity.

The evaluation of said mechanical properties may consist in particular of the utilization of the so-called Dynamic Mechanical Analysis method as described in the examples which follow and which report certain favorable embodiments of the present invention.

EXAMPLES

EXAMPLE 1

General Protocol

A—Example of a Mode of Realization of the Compounds According to the Invention

The contact, according to the invention, of at least one amylaceous component and at least one hydroxycarboxylic acid salt as well as possible additives is done at ambient temperature in a PAPPENMEIER homogenizer cooled by water circulation.

In the case of use of an hydroxycarboxylic acid salt which exists in liquid form (sodium lactate, for example), said salt is gradually added to the mixture, which is homogenized for a duration of several minutes.

B—Application of the Compounds to the Preparation of Thermoformed Articles

The compound obtained as previously described is at ambient temperature for example, introduced into the feed hopper of a transformation machine such as the BUSS PR 46 comixer.

This instrument, which allows the obtaining of a thermoformable compound and then its shaping, consists of a mixer followed by a recovery extruder with a crosshead and a die equipped with a knife, which permits the preparation of granules from the thermoformed article obtained, the latter being in the form of a rod. It will moreover be noted that the mixer and/or extruder are equipped with a devolatilisation well. The general methods of treatment are as follows:

- the projected holding temperature is 100° C. and, because of the water cooling and the feed zone, a gradient is set up, from approximately 80° (area near the feed zone) to 85° C. (die area);
- the rotation rate of the screw is adjusted in a manner to obtain the best possible mixture; it is set to between approximately 20 and 60 rpm;
- the pressure is maintained at a value lower than approximately 5 bar.

The thermoformed articles obtained in the present case (rods, granules) may be used as is. However, generally speaking, they are more readily intended for subsequent feeding into other continuous or discontinuous transformation devices such as injection moulding machines, single- or double-screw extruders, calenders, in view of the production of finished objects such as tubes, sections, films, plates, injected pieces.

C—Characterization of the Mechanical Properties of the Articles Obtained by Dynamic Mechanical Analysis Dynamic Mechanical Analysis is a method which is especially sensitive to any changes in structure and macromolecular interactions which induce a modification in the macroscopic properties of the material. It is a very sensitive technique for the determination of the variation of the moduli of elasticity and loss of a sample as a function of temperature. The same technique also gives access to the vitreous transition temperature (Tg) of the material. Knowledge of this piece of data as well as the damping properties measured in the solid state may be employed to predict the utilization temperature, the shock behavior as well as the rigidity of the finished product.

The principle of Dynamic Mechanical Analysis is based on the application to a sample of a sinusoidal linear deformation or torsional strain of given frequency and low amplitude superimposed on a continuous stress of known value. The response of the material is a stress of the same frequency but out of phase by an angle $\delta$. The behavior of the material is described by a complex function called the complex elastic modulus:

$$E^* = E' + iE''$$

where:

$E'$ is the elastic modulus and $E''$ is the modulus of viscosity. The angle of phase difference $\delta$ is such that tg$\delta$, also called the tangent of the loss angle, is equal to $E''/E'$.

A purely elastic material such as steel will give a zero angle of phase difference, that is to say a zero imaginary component. A purely viscous material such as water will give a zero real component. The angle of phase difference will then be 90°. For synthetic polymers, a viscoelastic material could cover all values between 0° and 90°.

A specific improvement was made to the method by the production of a measuring cell with special geometry which allows isolation of the test material from air by means of a silicone oil of very low viscosity; the problems linked to the presence of water in the sample are thus limited.

In the present case, the tests were conducted on an instrument of the type R.S.A. II (Rheometrics Solid Analyser). The geometry of measurement is the tension/cylindrical compression and temperature scans are performed at a constant frequency of stress. In our case the chosen frequency is $\omega = 10$ rad/s and the temperature range covers from ambient to approximately 150° C. A measurement is made every 2° C. while giving the sample 2.5 min. to equilibrate with the oven temperature.

The materials tested stem from the thermoformed rods obtained as previously described, which are removed and cut into test specimens with the following dimensions:

maximum diameter: 15 mm
preferred diameter: 8 to 14 mm
maximum thickness: 25 mm
preferred thickness: 3 to 5 mm

EXAMPLE 2

Characterization of a Thermoformed Article Obtained from a Compound Which does not Match the Invention An amylaceous compound is produced by the simple mixing of 80% by weight of native potato starch (water content: approximately 20%) and 20% by weight of water.

Said compound (hereafter designated reference compound 1) is introduced directly after its preparation into the hopper of a BUSS PR 46 comixer then treated as in EXAMPLE 1B above in view of obtaining a thermoformable compound then a rod-like thermoformed article.

A sample of said article is prepared then characterized by Dynamic Mechanical Analysis in accordance with EXAMPLE 1C above.

BRIEF DESCRIPTION OF THE DRAWINGS

FIGS. 2–12 show the entire curve for compounds tested by Dynamic Mechanical Analysis in Table 2.

EXAMPLE 3

Characterization of Thermoformed Articles from Compounds According to the Invention Various compounds are prepared, numbered 2 to 16, containing at least one amylaceous component and at least one hydroxycarboxylic acid salt, in this case sodium lactate.

Table 1 shown hereafter resumes for each compound the level of introduction (% by weight) of each of the components employed (amylaceous component, hydroxycarboxylic acid salt, possible additive(s)).

value of the tangent of the loss angle tgδ, measured by Dynamic Mechanical Analysis, is maximum.

Table 2 refers to FIGS. 2 to 12 which show the entire curve for some of the compounds tested in this manner, illustrating the evolution of the tangent of the loss angle tgδ as a function of temperature.

Figure 1:
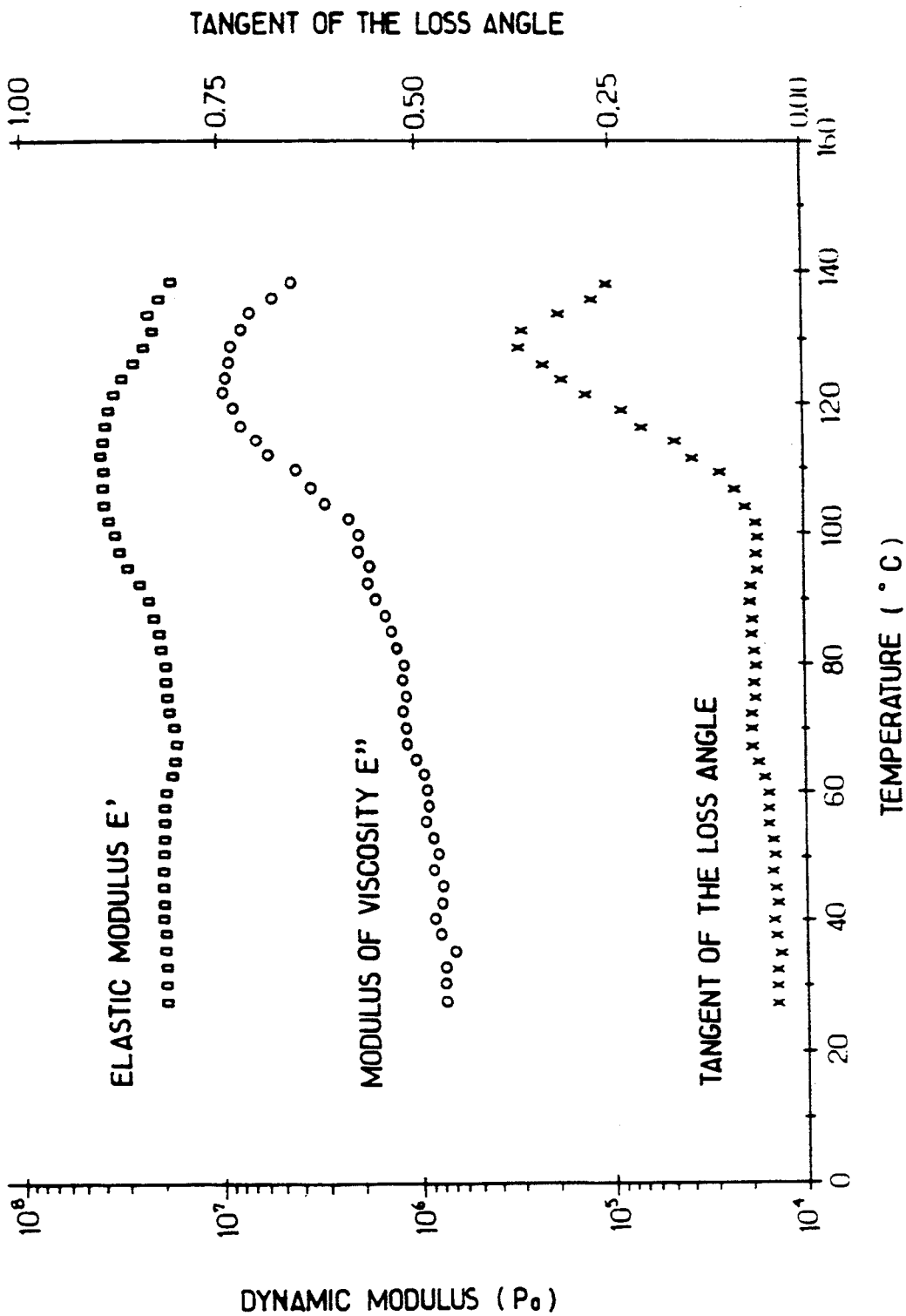
FIG. 1 shows for this sample the evolution of the tangent of the loss angle tg$\delta$ as a function of temperature. It is seen that the curve thus obtained shows a tg$\delta$ maximum situated at high temperature, around 130° C., and this, after a large temperature range where the tangent of the loss angle is practically zero, since the elastic modulus E' in this range is much higher than the modulus of viscosity E". We are then dealing with a brittle and rigid material at ambient temperature whose vitreous transition temperature must be located at around 130° C.
Figure 2:
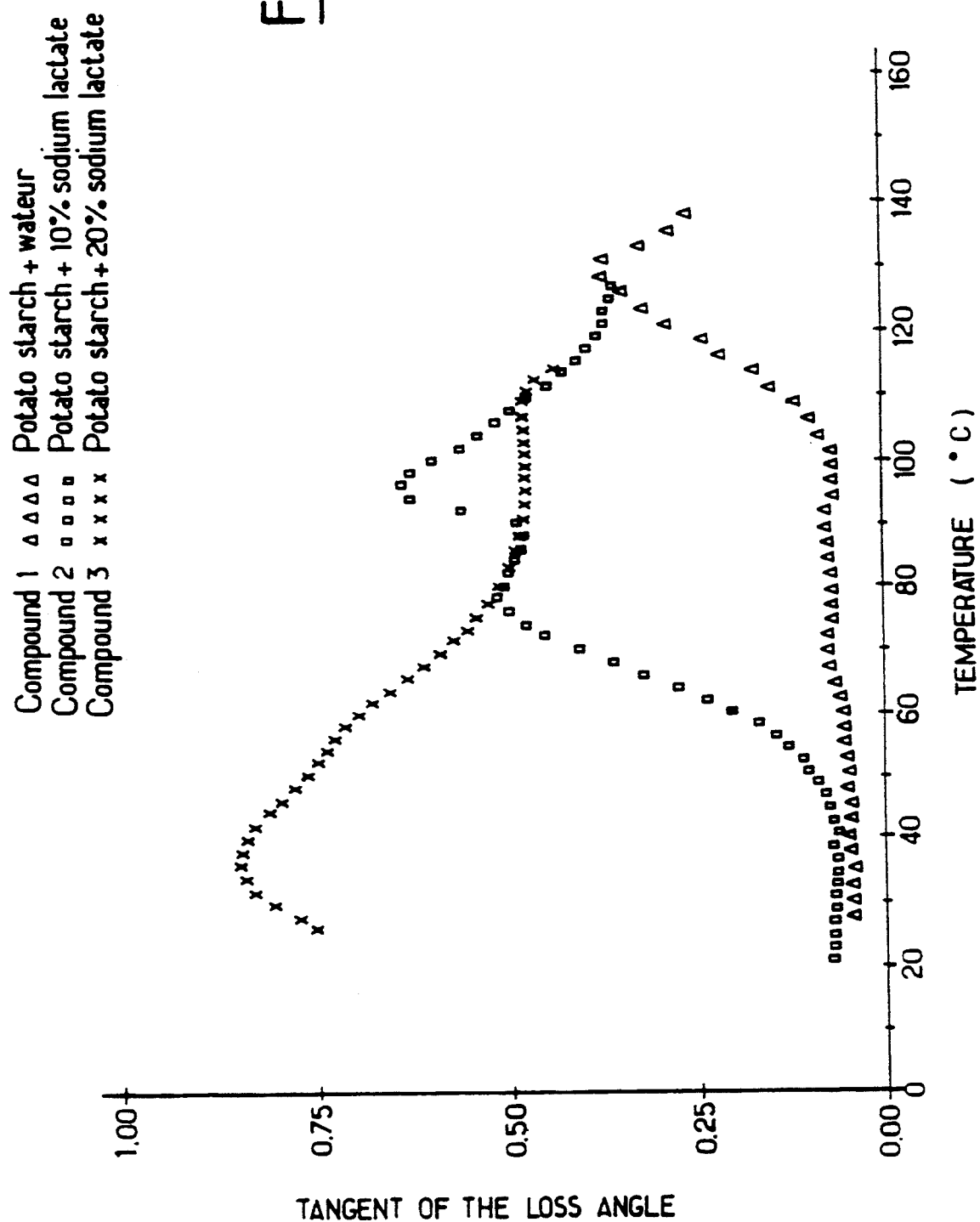
Figure 3:
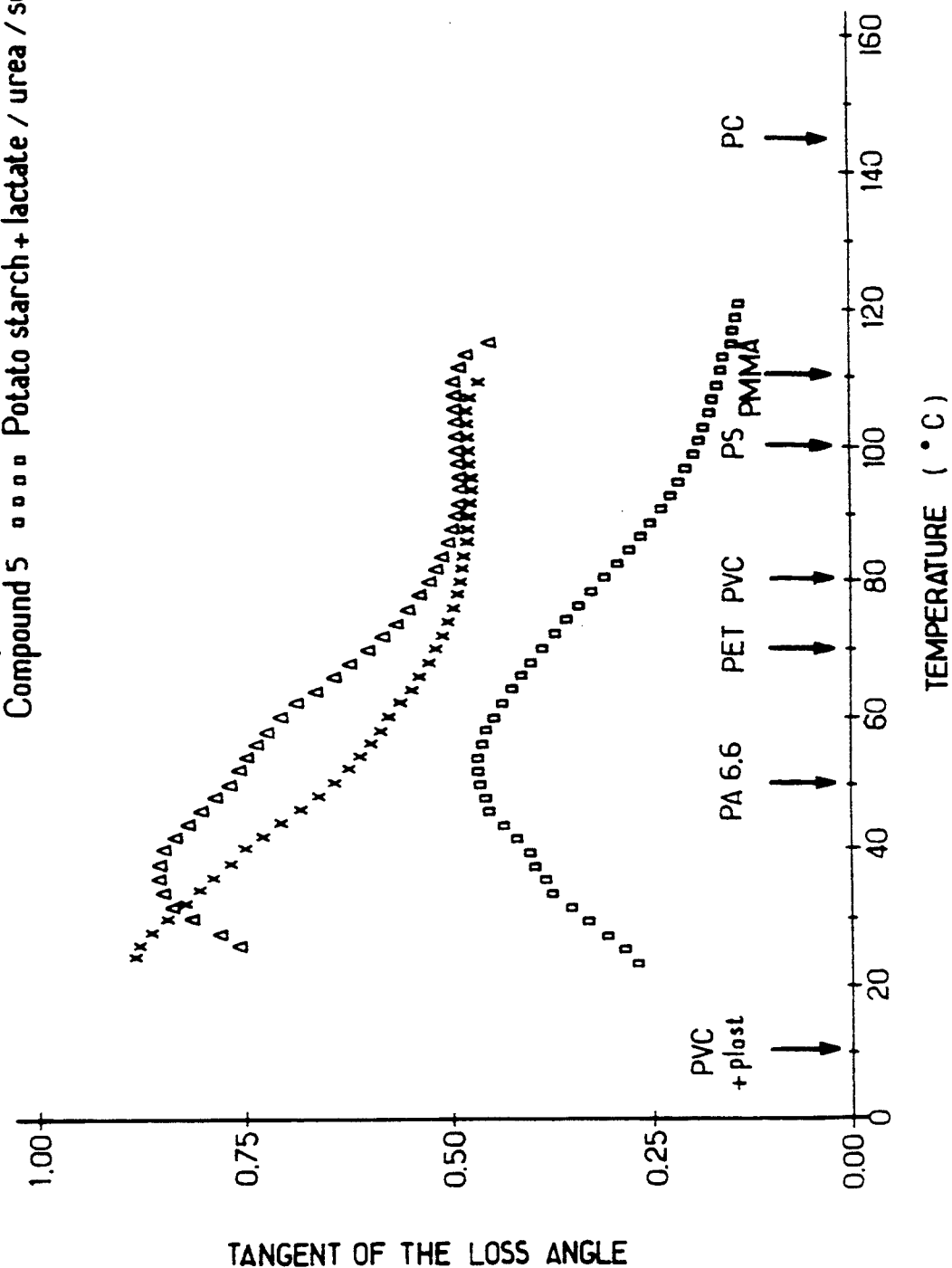
Figure 4:
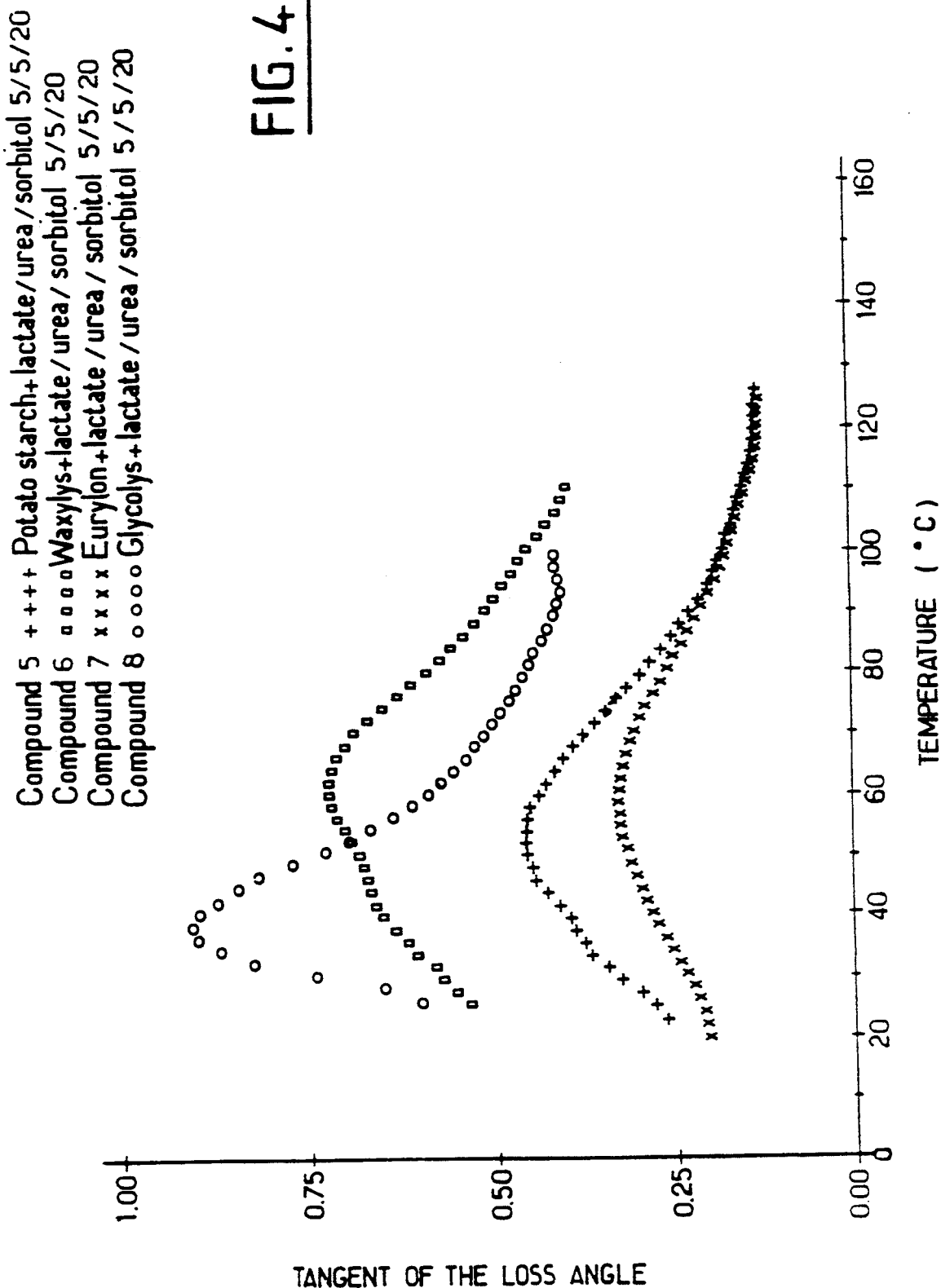
Figure 5:
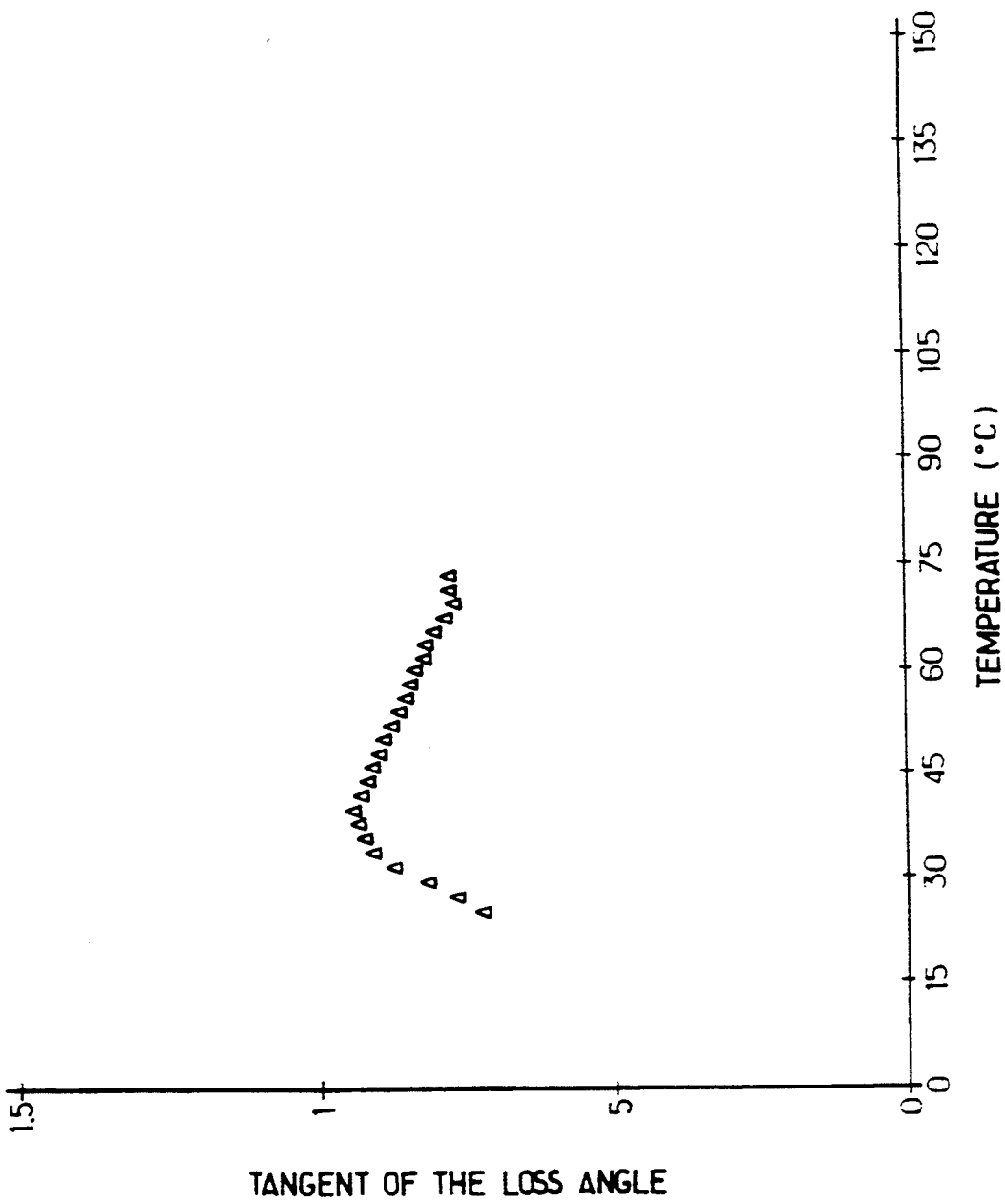
Figure 6:
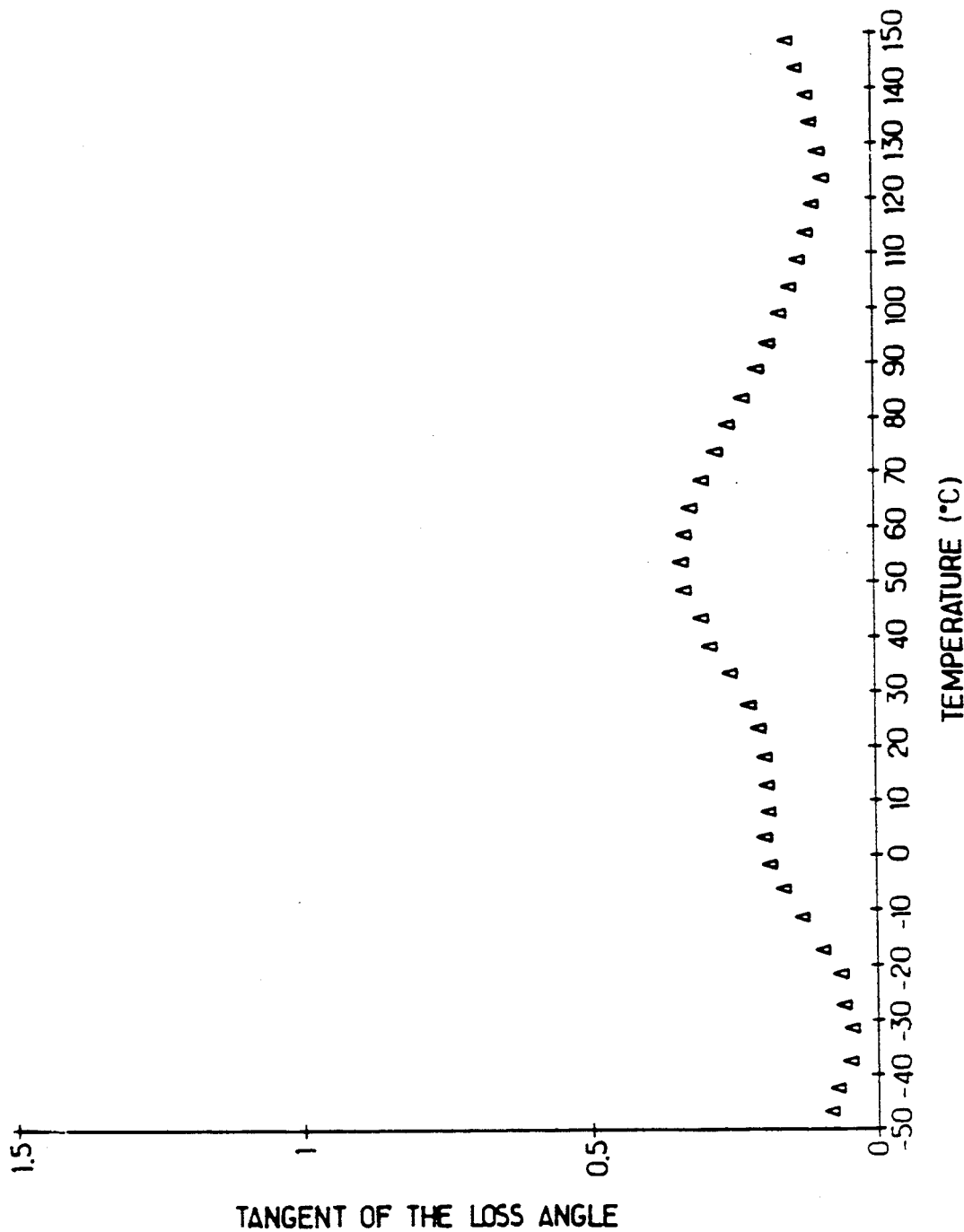
Figure 7:
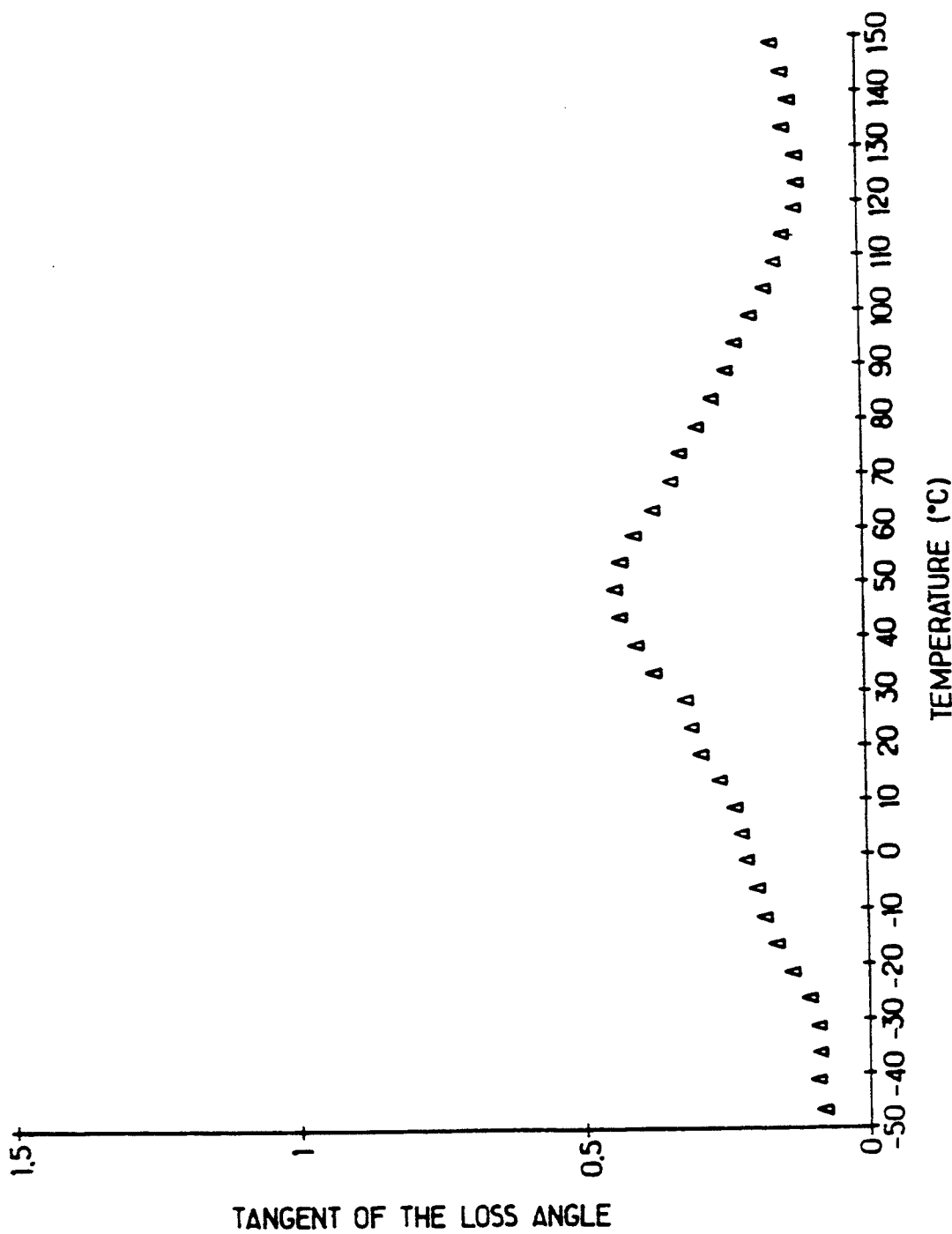

| Compound no. | Temperatures with maximum tgδ | Cf. figures |
|---|---|---|
| 1 (reference) | approx. 130° C. | FIG. 2 |
| 2 | approx. 95° C. | FIG. 2 |
| 3 | approx. 35° C. | FIG. 2 |
| 4 | <30° C. | FIGS. 2 and 3 |
| 5 | approx. 53° C. | FIGS. 3 and 4 |
| 6 | approx. 62° C. | FIG. 4 |
| 7 | approx. 60° C. | FIG. 4 |
| 8 | approx. 37° C. | FIG. 4 |
| 9 | approx. 35° C. | FIG. 5 |
| 10 | approx. 50° C. | FIG. 6 |
| 11 | approx. 48° C. | FIG. 7 |
| 12 | approx. 50° C. | FIG. 8 |

TABLE 1

| No. of Compound | Amylaceous component Type | % by wt. | Hydroxycarboxylic acid salt Type | % | Possible additive(s) Type | % |
|---|---|---|---|---|---|---|
| 2 | potato starch | 90 | Na lactate | 10 | — | — |
| 3 | idem | 80 | idem | 20 | — | — |
| 4 | idem | 70 | idem | 20 | urea | 10 |
| 5 | idem | 70 | idem | 5 | urea | 5 |
|   |   |   |   |   | sorbitol | 20 |
| 6 | WAXILYS ® waxy cornstarch | 70 | idem | 5 | urea | 5 |
|   |   |   |   |   | sorbitol | 20 |
| 7 | EURYLON ® 7 high-amylose cornstarch | 70 | idem | 5 | urea | 5 |
|   |   |   |   |   | sorbitol | 20 |
| 8 | GLYCOLYS ® D cross-linked carboxymethylated potato starch | 70 | idem | 5 | urea | 5 |
|   |   |   |   |   | sorbitol | 20 |
| 9 | etherified (hydroxyethylated) waxy cornstarch | 70 | idem | 5 | urea | 5 |
|   |   |   |   |   | sorbitol | 20 |
| 10 | potato starch | 70 | Na gluconate | 5 | urea | 5 |
|   |   |   |   |   | sorbitol | 20 |
| 11 | idem | 70 | OGS | 5 | urea | 5 |
|   |   |   |   |   | sorbitol | 20 |
| 12 | idem | 70 | di-Na tartrate | 5 | urea | 5 |
|   |   |   |   |   | sorbitol | 20 |
| 13 | idem | 70 | tri-Na citrate | 5 | urea | 5 |
|   |   |   |   |   | sorbitol | 20 |
| 14 | HI-CAT ® 180 cationic potato starch | 70 | sodium lactate | 5 | urea | 5 |
|   |   |   |   |   | sorbitol | 20 |
| 15 | high-amylose cationic cornstarch | 70 | idem | 5 | urea | 5 |
|   |   |   |   |   | sorbitol | 20 |
| 16 | ERYLON ® 7 high-amylose cornstarch | 60 | idem | 10 | glycerol | 5 |
|   |   |   |   |   | sorbitol | 15 |
|   |   |   |   |   | Clarène ® EVOH R20 | 10 |

The sodium lactate is used as an aqueous solution containing 80% dry substance.
The urea is used in anhydrous powder form.
The sorbitol is used in powder form.

These compounds are introduced directly after their preparation into the hopper of a BUSS PR 46 comixer then treated according to EXAMPLE 1B above in view of obtaining thermoformable compounds then thermoformed articles of the rod type.

A sample of each of the articles obtained is prepared and then characterized by Dynamic Mechanical Analysis according to EXAMPLE 1C cited above.

Table 2, shown below, summarizes for each of the compounds according to the invention nos. 2 to 16, as well as for reference compound 1 tested within the context of EXAMPLE 2, the temperature at which the

| 13 | approx. 50° C. | FIG. 9 |
| 14 | approx. 40° C. | FIG. 10 |
| 15 | approx. 45° C. | FIG. 11 |
| 16 | approx. 48° C. | FIG. 12 |

FIG. 3 moreover shows the vitreous transition temperatures of the different traditional synthetic polymers listed below, which are generally distributed over a temperature range between approximately 0° and 150° C.

| PVC = | polyvinylchloride |
| PVC + plast. = | PVC + plasticizer (30% of diethylhexylsuccinate) |
| PA 6.6 = | polyamide 6—6 |
| PET = | polyethylene terephthalate |
| PS = | polystyrene |
| MPMA = | methyl polymethacrylate |

-continued

| | |
|---|---|
| PC = | polycarbonate |

It stands out globally from Table 2 and FIGS. 2 to 12 that the thermoformable compounds according to the invention, whose preparation and use present no particular technical problems, enable the preparation of thermoformed articles with a large range of mechanical properties. FIG. 2 in particular shows that the combination of an amylaceous component such as potato starch with an hydroxycarboxylic acid salt such as sodium lactate, in accordance with the invention, allows work in operating conditions, especially of temperature, which are significantly less severe than those generally required within the context of obtaining and transforming thermoformable amylaceous materials.

In the present case we witness, by the addition of sodium lactate (compounds 2 and 3) in place of and on behalf of water (reference compound 1), a displacement of the tgδ temperature maximum of the material obtained (approximately 130° C.) towards significantly lower temperatures, for example to approximately 95° C. or 35° C. for compounds 2 and 3, respectively. The result, for example, is that as a function of the level of addition of a hydroxycarboxylic acid salt to the thermoformable compounds according to the invention, it is possible to manufacture materials presenting varying flexibility at ambient temperature.

Moreover, the possible use of additives such as urea anti/or sorbitol permits a further adjustment of the viscoelastic properties and of the value of this tangent of the loss angle temperature maximum as shown by the curves in FIG. 3.

It may be observed, for example, that the use of urea (compound 4) makes it possible to obtain an even lower tgδ temperature maximum (t<30° C. instead of approximately 35° C. for compound 3 which does not contain urea).

In another respect, the Applicant Company has observed that the use of sorbitol brings about an improvement of the thermal and mechanical resistance of the finished product.

The curves in FIGS. 4 and 5 illustrate the possibility of utilizing, within the thermoformable compounds according to the invention, particularly those which must be treated at temperatures lower than approximately 120° C., including lower than 100° C., amylaceous components of very wide diversity in either their origin (for example, potato starch, high-amylose starch, waxy starch) or in their possible mode of modification by the chemical (etherification and/or cross-linking, for example) and/or physical route.

Finally, compounds 10 to 13 corresponding to FIGS. 6 to 9 illustrate the possibility of using various hydroxycarboxylic acid salts which all lead to a significant reduction of the maximum tangent of the loss angle temperature.

We claim:

1. Thermoformable compound comprising at least one amylaceous component and at least one hydroxycarboxylic acid salt.

2. Compound according to claim 1, characterized in that the amylaceous component exists in a partially melted state.

3. Compound according to claim 1, characterized in that it is capable of providing a thermoformed article with a tangent of the loss angle tgδ whose maximum value is found at a temperature not exceeding 150° C.

4. Compound according to claim 1, characterized in that the amylaceous component is selected from the group consisting of natural and hybrid native starches from corn, wheat, rice, peas, potato, manioc, amylaceous-containing cuts and fractions obtained from said starches and mixtures thereof.

5. Compound according to claim 1, characterized in that the amylaceous component is selected from the group consisting of natural and hybrid chemically-modified starches.

6. Compound according to claim 5, wherein the natural and hybrid chemically-modified starches are modified by ionic or nonionic etherification, esterification, cross-linking, oxidation, alkaline treatment, acid hydrolysis, enzymatic hydrolysis, or combinations thereof.

7. Compound according to claim 1, characterized in that the amylaceous component is composed of a native or modified, high-amylose starch.

8. Compound according to claim 1, characterized in that the hydroxycarboxylic acid salt is selected from the group consisting of salts of monohydroxy/monocarboxylic acids, salts of polyhydroxy/monocarboxylic acids and mixtures thereof.

9. Compound according to claim 1, characterized in that the hydroxycarboxylic acid salt is an alkali metal or alkaline earth metal salt of lactic acid, gluconic acid, maltobionic acid, lactobionic acid or glyceric acid, or an oxidized starch hydrolysate.

10. Compound according to claim 9, characterized in that the oxidized starch hydrolysate is an oxidized glucose syrup.

11. Compound according to claim 1, characterized in that the hydroxycarboxylic acid salt is an alkali metal or alkaline earth metal salt of lactic acid.

12. Compound according to claim 1, having a weight ratio between the amylaceous component and the hydroxycarboxylic acid salt of between approximately 99/1 and 25/75, based on dry weight of the hydroxycarboxylic acid salt.

13. Compound according to claim 1, further comprising at least one additive selected from the group consisting of extension and charge agents, synthetic resins, plasticizers, water-repellant agents, lubricants, dyes, fire-repellants, antioxidants, and fungicides.

14. Compound according to claim 1, further comprising at least one additive selected from the group consisting of urea, hydrogenated sugar-containing products, glycerol, and synthetic resins.

15. Compound according to claim 14, wherein the hydrogenated sugar is sorbitol, mannitol, maltitol, or lactitol.

16. Compound according to claim 1, further comprising an additive selected from the group consisting of urea, sorbitol, glycerol, and mixtures thereof.

17. Compound according to claim 1, characterized in that the amylaceous component is a cationized starch.

18. Compound according to claim 1, characterized in that the hydroxycarboxylic acid salt is selected from the group consisting of an alkali metal or alkaline earth metal salt of monohydroxy/monocarboxylic acid or polyhydroxy/monocarboxylic acid, or mixtures thereof.

19. Compound according to claim 1, wherein the hydroxycarboxylic acid is a sodium or potassium salt of a monohydroxy/monocarboxylic acid, a polyhydroxy/monocarboxylic acid, or mixture thereof.

20. Compound according to claim 1, characterized in that the hydroxycarboxylic acid salt is sodium lactate or potassium lactate.

21. Compound according to claim 1, having a weight ratio between the amylaceous component and the hydroxycarboxylic acid salt of between approximately 98/2 and 60/40, based on dry weight of the hydroxycarboxylic acid salt.

22. Compound according to claim 1, further comprising additives included at a maximum of 30% of the total weight of the compound.

23. Compound according to claim 1, further comprising urea at a maximum of 10% of the total weight of the compound.

* * * * *